(12) United States Patent
Kunert et al.

(10) Patent No.: US 9,533,440 B2
(45) Date of Patent: Jan. 3, 2017

(54) DEVICE FOR HOLDING A COMPONENT TO BE SHEATHED IN PLASTIC, AND METHOD FOR SHEATHING A COMPONENT

(71) Applicant: Robert Bosch GmbH, Stuttgart (DE)

(72) Inventors: Peter Kunert, Lichtenstein (DE); Christian Ohl, Pfullingen (DE); Matthias Waibler, Remshalden-Hebsack (DE); Michael Hortig, Eningen unter Achalm (DE); Matthias Ludwig, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 811 days.

(21) Appl. No.: 13/655,553

(22) Filed: Oct. 19, 2012

(65) Prior Publication Data

US 2013/0099415 A1 Apr. 25, 2013

(30) Foreign Application Priority Data

Oct. 21, 2011 (DE) .......................... 10 2011 085 032

(51) Int. Cl.
*B23P 19/04* (2006.01)
*B29C 45/14* (2006.01)
*H01R 43/24* (2006.01)

(52) U.S. Cl.
CPC ......... *B29C 45/14065* (2013.01); *H01R 43/24* (2013.01)

(58) Field of Classification Search
CPC ........... B25B 27/02; B25B 27/06; B25B 27/00
See application file for complete search history.

(56) References Cited

U.S. PATENT DOCUMENTS

| 3,594,890 A * | 7/1971 | Cordell | B25B 27/0085 29/255 |
| 6,807,884 B2 * | 10/2004 | Sillman | B25B 23/00 81/180.1 |
| 8,656,569 B2 * | 2/2014 | Klann | B25B 27/0064 29/255 |
| 2012/0199501 A1 * | 8/2012 | Le Gette | F16M 11/04 206/45.24 |
| 2012/0324970 A1 * | 12/2012 | Watanabe | E05B 37/16 70/315 |
| 2013/0099415 A1 * | 4/2013 | Kunert | B29C 45/14065 264/275 |

FOREIGN PATENT DOCUMENTS

DE 103 57 647 7/2005
DE 10 2007 057 441 6/2009

* cited by examiner

*Primary Examiner* — Lee D Wilson
(74) *Attorney, Agent, or Firm* — Norton Rose Fulbright US LLP; Gerard Messina

(57) ABSTRACT

A device for holding a component to be sheathed with plastic includes a holding element for producing a releasable mechanical keyed connection with an affixation region of the component, which holding element has a push-twist locking element.

6 Claims, 4 Drawing Sheets

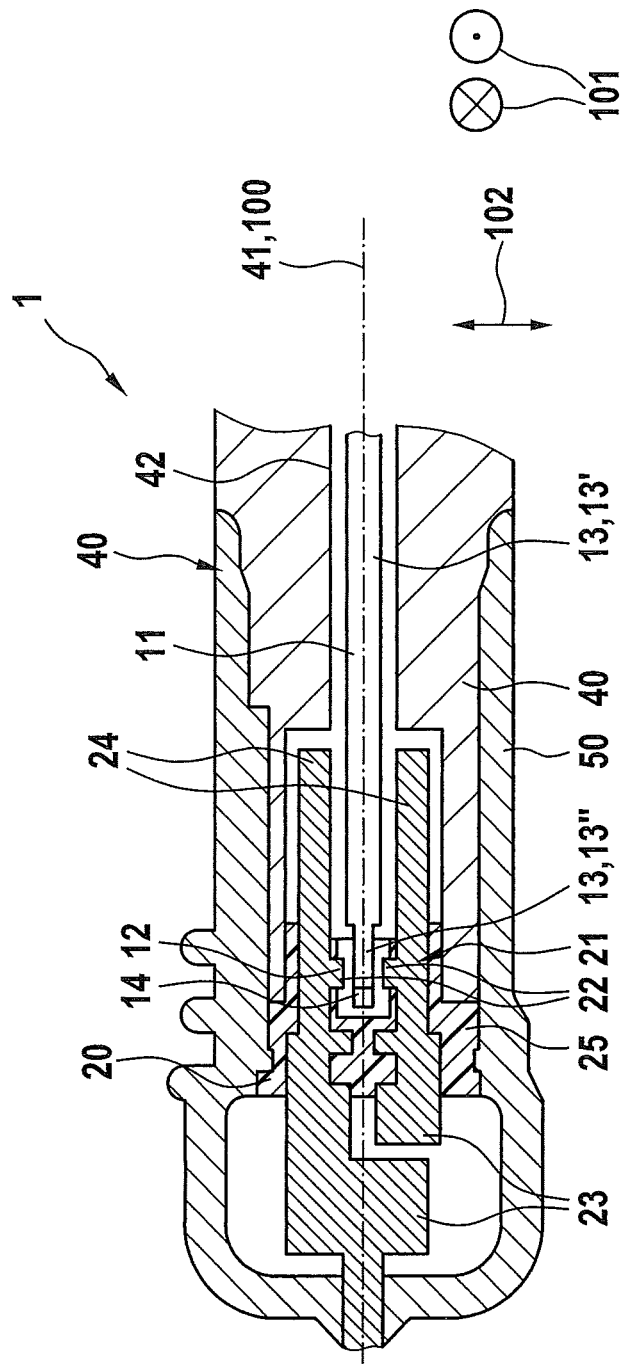

DEVICE FOR HOLDING A COMPONENT TO BE SHEATHED IN PLASTIC, AND METHOD FOR SHEATHING A COMPONENT

BACKGROUND OF THE INVENTION

1. Field of the Invention

The present invention relates to a device for holding a component to be sheathed in plastic, and a method for sheathing a component.

2. Description of the Related Art

Such devices are generally known. For example, a device for sheathing an insert with plastic using casting technology is known from published German patent application document DE 103 57 647 A1. To hold the insert inside a casting mold during the sheathing procedure, the device is provided with a mandrel which is rotatable and displaceable longitudinally. The mandrel is provided with a self-cutting outer thread and can be screwed into an opening of the insert. This system has the disadvantage that the screw-fitting of the outer thread into the opening produces a torque, which acts on the insert and must be absorbed by means of a suitable locking element which is adapted to the component geometry. In addition, the cutting of the self-cutting thread into the wall of the opening causes abrasion, which can lead to contamination of the casting mold.

In addition, a component which is produced by sheathing a sensor module with a plastic mass is known from the printed publication published German patent application document DE 10 2007 057 441 A1.

BRIEF SUMMARY OF THE INVENTION

In contrast to the related art, the device according to the present invention and the method according to the present invention have the advantage of obtaining a considerably faster, simpler and more secure connection between the holding element and the component.

This is accomplished by producing a push-twist connection between the holding element and the component. The push-twist connection is able to be produced and released relatively quickly since it merely requires the holding element to be rotated relative to the component about an angle of rotation that is considerably smaller than in the related art. The angle of rotation preferably lies between 45 degrees and 180 degrees, particularly preferably between 70 and 110 degrees and particularly preferably at essentially 90 degrees.

In addition, no torque is acting on the component when the push-twist connection is produced or released, so that no locking element is required, in contrast to the related art. Furthermore, no abrasion is produced by thread cutting, thereby eliminating the contamination risk arising from abrasion.

A push-twist connection within the meaning of the present invention in particular includes a connection between a first and a second connection element, in which the first connection element is moved in the direction of the second connection element in translatory fashion, whereupon the first connection element and the second connection element are rotated relative to each other at a predefined angle. A bayonet lock, for example, is such a push-twist connection. In the device according to the present invention, the push-twist connection element preferably is the first connection element, and the affixation region is the second connection element (or vice versa). The push-twist locking element and the affixation region in particular have no thread and thus also do not have the mentioned disadvantages of the related art. The component, in particular, includes a sensor module, which is provided for the direction-dependent sensing of physical measuring quantities, which means that a precise adjustment of the orientation of the component during the sheathing production is relatively important. The sensor module, for example, includes a multiaxial rate-of-rotation sensor, a multiaxial acceleration sensor, a multiaxial magnetic field sensor, or a similar device. For the sheathing, the sensor module preferably is injection-molded in a molding process using plastic, so as to produce a housing.

According to one preferred specific embodiment, the holding element has a mandrel extending along an axial direction, and the push-twist locking element includes at least one keyed-connection element, the at least one keyed-connection element projecting from the mandrel along a transverse direction that runs perpendicular to the axial direction of the mandrel. In an advantageous manner, this allows a holding means, situated in the affixation region, of the component to be gripped from behind, so that a keyed-connection join is produced between the component and the device along the axial direction. The holding means, for example, includes a corresponding hook on the component. It is conceivable that the holding means is formed on a metallic insert of the component, e.g., in a plug region of the insert. The space required for anchoring the component in the region of the component is advantageously reduced. In particular, no region having an additional opening is required, in contrast to the related art. It is conceivable that the component has a plug opening (female plug part) in the plug region anyway, in which the insert provided with holding means is lying freely exposed, so that the holding element is able to be inserted into the plug opening and a keyed connection with the holding means is achievable by a rotation.

According to one preferred specific embodiment, the push-twist locking element has two keyed-connection elements, one of the two keyed-connection elements being situated on each side of the mandrel along the transverse direction. This advantageously produces a symmetrical fixation of the holding element along the transverse direction and thereby increases the holding force.

According to one preferred specific embodiment, a first maximum extension of the holding element along the transverse direction in the region of the at least one keyed-connection element is greater than a second maximum extension of the holding element along the transverse direction in an affixation region adjacent to the keyed-connection element in the axial direction. In an advantageous manner, once the holding element has been rotated, it is therefore possible for the holding means to project into the affixation region, so that the keyed-connection elements are able to grab the holding means from behind.

According to one preferred specific embodiment, the first maximum extension of the holding element along the transverse direction in the region of the at least one keyed-connection element is greater than a third maximum extension of the holding element along a further transverse direction perpendicularly situated both with respect to the axial direction and the transverse direction. In a first angular position relative to the axial direction, the holding element therefore is advantageously displaceable in the direction of the component, such that the keyed-connection elements pass the holding means of the component without interference, while the keyed-connection elements grab the holding means from behind, in that the holding element is transferred from the first angular position to a second angular position, which is rotated at the angle of rotation relative to the first angular position. In the second angular position, the keyed-connection means prevent an unhampered passage of the holding means so as to provide a stable connection (the push-twist connection) between the component and the device.

According to one preferred specific embodiment, on a side facing away from the component, the at least one keyed-connection element has a functional area for the form- and/or force-fitting cooperation with the affixation region, the functional area being beveled in relation to a transverse plane that runs perpendicularly to the axial direction. Transferring the holding element from the first angular position to the second angular position advantageously not only establishes the push-twist connection, but simultaneously also generates an axial force from the keyed-connection elements on the holding means, in the direction of the device. In addition to the keyed connection between the keyed-connection elements and the holding means, a frictional connection is produced between the keyed-connection elements and the holding means.

According to one preferred specific embodiment, the device has a base body, and the holding element is mounted on the base body; the holding element is supported on the base body so as to allow a displacement along the axial direction, and/or to allow a rotation about an axis of rotation that runs centrally through the holding element and extends parallel to the axial direction. For the displacement motion and/or for the rotary motion relative to the base body, it is especially preferred if the holding element is driven by a single motor or by two separate motors (one motor for the displacement motion and another motor for the rotary motion). The device in particular is situated in a sealable casting mold, in which the envelope for producing the sheathing is cast. A closing and opening mechanism of the casting mold is preferably coupled to the one motor, or to one of the two motors or to both motors, in such a way that the closing and opening motion of the casting mold and the displacement and/or the rotary motion of the holding element are linked to one another, or synchronized.

Another subject matter of the present invention is a method for sheathing a component, in which the component and a device for holding the component are provided in a first method step, and the component is injection-molded using plastic in a third method step, and in which in a second method step for producing a push-twist connection between the component and the device, a holding element of the device is furthermore introduced into an affixation region of the component in a first substep, and a push-twist locking element of the holding element is rotated relative to the affixation region in a second substep. In terms of timing, the second method step is carried out between the first and the third method steps, in particular. In comparison to the related art, the method according to the present invention allows a much faster, simpler and cleaner production of a connection between the component and the device, without abrasion being produced in the process or a torque being applied to the component. Furthermore, following the third method step, a fourth method step for releasing the push-twist connection is preferably implemented, in which the push-twist locking element is first rotated back relative to the affixation region, and the holding element is subsequently pulled out of the affixation region.

According to one preferred specific embodiment, in the first sub-step the push-twist locking element is displaced along an axial direction of the holding element in such a way that at least one keyed-connection element of the push-twist locking element passes a holding means of the component, and in the second substep the push-twist locking element is rotated about an axis of rotation that runs parallel to the axial direction, such that a keyed connection is established between the at least one holding means and the at least one keyed-connection element along the axial direction. This advantageously makes it possible to produce and release the push-twist connection between the component and the device in an uncomplicated manner.

According to one preferred specific embodiment, in a third substep of the second method step the holding means is displaced counter to the axial direction, in such a way that an in particular hermetically sealed keyed connection is produced between the component, a base body of the device and the component. This avoids that plastic, with which the component is sheathed in the third method step, makes its way into the affixation region.

Exemplary embodiments of the present invention are illustrated in the drawing and explained in greater detail in the following description.

BRIEF DESCRIPTION OF THE DRAWINGS

FIGS. 3a and 3b show schematic views of a device and a method according to the first specific embodiment of the present invention.

DETAILED DESCRIPTION OF THE INVENTION

In the various figures, identical parts have always been provided with the same reference symbols and are therefore usually labeled or mentioned only once.

Figure 1:
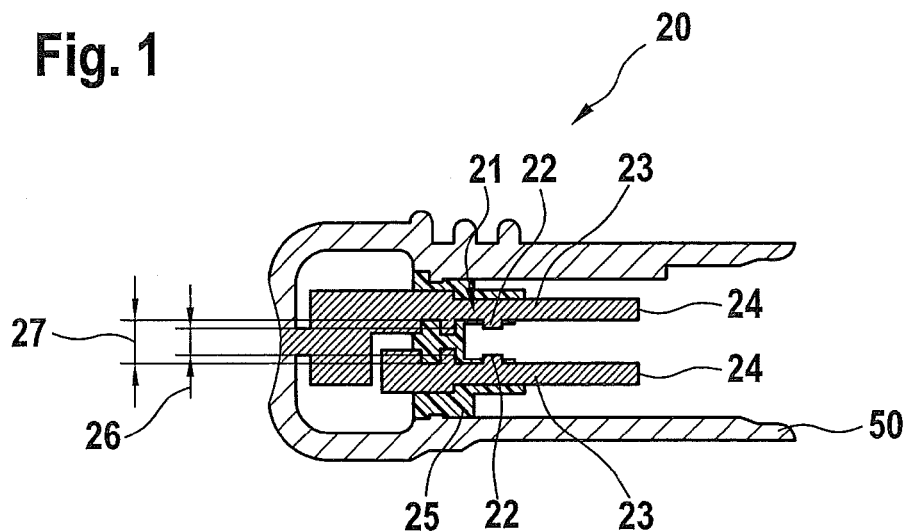
FIG. 1 shows a schematic illustration of a component for holding and sheathing by means of a device and a method according to a first specific development of the present invention.

FIG. 1 shows a schematic view of a component 20, which is to be held and sheathed by means of a device 10 and a method according to a first specific development of the present invention. Component 20 includes a metallic insert 23, which has a plug region featuring two plug contacts 24 on one side; on the other side it is connected, for instance in electrically conductive manner, to a sensor module, which is not shown. The sensor module preferably includes a micromechanical and multiaxial rate-of-rotation, acceleration and/or magnetic field sensor. The sensor module is preferably enclosed by a sensor housing, which is produced by a molding method. Furthermore, insert 23 is partially sheathed by an inner sheathing element 25 in the form of a premolded part. Insert 23 has an affixation region 21, where insert 23 is provided with holding means 22. In the region of the two plug contacts 24, holding means 22 are implemented in the form of hooks that project inwardly, perpendicularly to axial direction 100. The hooks face each other. Holding means 22 are punched out accordingly, especially when punching metallic insert 23. Furthermore, holding means 22 are disposed in the region of inner sheathing element 25 along axial direction 100. To illustrate how component 20 is to look following the sheathing, sheathing 50 of component 20 with plastic has been drawn in already. Sheathing 50 is produced by injection molding in a casting mold (not shown) using a thermoplastic plastic, component 20 being held by a device 10 during this casting or injection-molding operation, which will be described in the following text with the aid of FIGS. 2, 3a and 3b.

Figure 2:
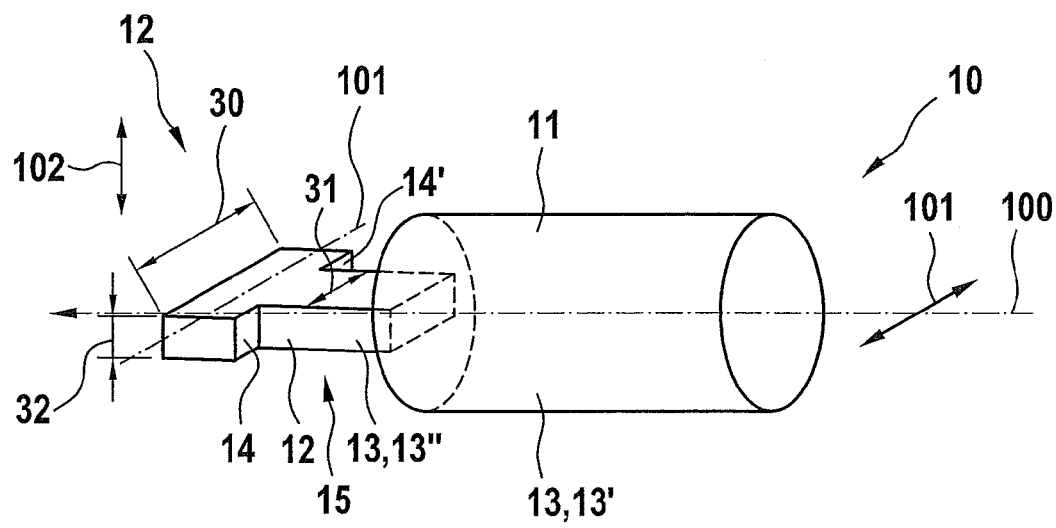
FIG. 2 shows a schematic perspective view of a holding element of a device according to the first specific embodiment of the present invention.

FIG. 2 shows a schematic perspective view of a holding element 11 of a device 10 according to the first specific embodiment of the present invention. Device 10 has a holding element 11, which extends along an axial direction 100 and includes a mandrel 13 as well as a push-twist locking element 12. In the example at hand, mandrel 13 has a cylindrical first subregion 13' and a square-shaped second subregion 13", the maximum diameter of second subregion 13" being smaller than the maximum diameter of first subregion 13'. Second subregion 13" includes an end region of mandrel 13, which is introduced into affixation region 21 in order to hold component 20. Push-twist locking element 12 in turn is developed in an end region of second subregion 13" and includes two keyed-connection elements 14, 14', which project from mandrel 13 in a transverse direction 101 that runs perpendicularly to axial direction 100. Both keyed-connection elements 14, 14' are developed in such a way that a first maximum extension 30 of push-twist locking element 12 in the area of keyed-connection elements 14, 14' and along transverse direction 101 is greater than a third maximum extension 32 of push-twist locking element 12 and, in particular, second subregion 13" along a further transverse direction 102 that runs perpendicularly to axial direction 100 and to transverse direction 101. This has the advantage that push-twist locking element 12 is able to be inserted into affixation region 21, past holding means 22, without keyed-connection elements 14, 14' making contact with holding means 22 (see FIG. 3a). Second subregion 13" furthermore has an engagement region 15, which is adjacent to keyed-connection elements 14, 14' along axial direction 100. A maximum second extension 31 of engagement region 15 along transverse direction 101 is smaller than first extension 30. This has the advantage that holding means 22 may project into engagement region 15 when push-twist lock 12 is introduced into affixation region 21 and is twisted there at an angle of rotation of essentially 90 degrees about an axis of rotation 41 that extends parallel to axial direction 100 and centrically through holding element 11 (see FIG. 3b). Keyed-connection elements 14, 14' then engage behind holding means 22 in axial direction 100, so that a keyed connection is established between holding means 22 and keyed-connection elements 14, 14'. Holding means 22 are then disposed in particular between keyed-connection elements 14, 14' and first subregion 13' along axial direction 100. Third extension 32 in particular is smaller than a first distance 26 between holding means 22, while first extension 30 in particular is greater than first distance 26. A second distance 27 between the two plug contacts 24 in a region adjacent to holding means 22 along axial direction 100 in particular is greater than first extension 30 and first distance 26 in each case.

Figure 3B:
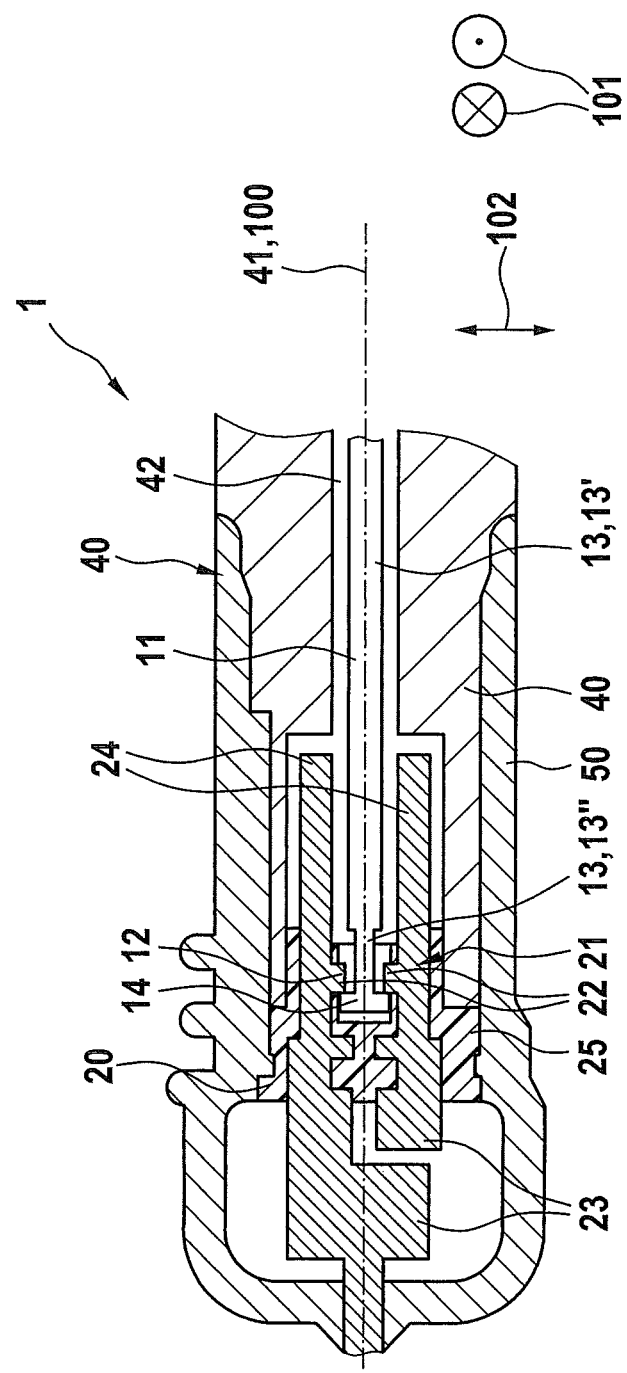

FIGS. 3a and 3b show schematic views of device 10 and the method according to the first specific embodiment of the present invention, while a push-twist connection is established between holding element 11 illustrated in FIG. 2 and component 20 illustrated in FIG. 1. The push-twist connection is used so that device 10 may hold component 20 in a casting mold (not shown) such that it is able to be injection-molded with plastic in order to produce sheathing 50. The push-twist connection is produced by two substeps, the first substep being described with the aid of FIG. 3a, and the second substep being described with the aid of FIG. 3b. In contrast to the illustration in FIG. 2, device 10 furthermore has a base body 40 having a central through hole 42, in which first subregion 13' is supported in a manner allowing an axial displacement along axial direction 100 and a rotation about axis of rotation 41.

In the first substep, component 20 and device 10 are moved toward each each other in the axial direction (100). This causes base body 40 to come into contact with inner sheething element 25. Furthermore, the relative movement of component 20 and device 10 causes holding element 11 to be inserted into the plug region in axial direction 100, and between the two plug contacts 24. In the process, push-twist lock 12 is oriented in a first angular position relative to axis of rotation 41 such that keyed-connection elements 14, 14' are able to pass holding means 22 in unhampered manner, so that push-twist lock 12 is able to be inserted into affixation region 21 without interference. Keyed-connection elements 14, 14' extend at a right angle to holding means 2, in particular, so that no contact is possible between keyed-connection elements 14, 14' and holding means 22.

In the following second substep, holding element 11 is rotated by 90 degrees relative to base body 40 and relative to component 20, about axis of rotation 41. Push-twist lock 12 thus is transferred from the first angular position to a second angular position which is rotated by 90 degrees. In this second angular position keyed-connection elements 14, 14' and holding means 22 are aligned parallel to each other and therefore overlap along axial direction 100.

In a subsequent third substep, holding element 11 is moved in the direction of base body 40 in axial direction 100 and in particular a force is applied to it, such that a keyed connection, especially a force-fitting or frictionally engaged connection, comes about between keyed-connection elements 14, 14' and holding means 22. Inner sheathing element 25 thus is pressed against base body 40 in sealing manner, so that no plastic material makes its way into the plug region or into the region of holding element 11 during the sheathing process. It is conceivable that holding means 11 is coupled to a spring and thus is flexibly supported along axial direction 100, so that a force restriction takes place in a travel control of holding element 11 for the application of force to holding element 11 in the direction of base body 40. Then, component 20 is injection-molded with the plastic material in order to produce sheathing 50. Sheathing 50 has been sketched in FIGS. 3a and 3b merely for illustrative purposes. Prior to the actual sheathing step, component 20 is of course still without sheathing 50.

Following the sheathing operation, the force application of holding element 11 in the direction of base body 40 is canceled, and holding element 11 is rotated back about axis of rotation 41 such that push-twist locking element 12 is moved from the second angular position back to the first angular position illustrated in FIG. 3a. Holding element 11 is then pulled out of the plug region in axial direction 100.

Device 10 preferably has a casting mold (not shown), in which device 10 is situated or is to be placed. During the casting operation, the casting mold is preferably closed and then opened again following the casting operation. It is conceivable that the displacement and rotary motion of holding element 11 is linked to the opening and closing motion of the casting mold, the displacement and rotary motion of holding element 11 and the opening and closing motion of the casting mold preferably being driven by only a single motor (not shown). As an alternative, it is conceivable that one motor is provided for the opening and closing motion of the casting mold and a separate motor is provided for the displacement and rotary motion of holding element 11. It is furthermore conceivable that the displacement and rotary motion of holding element 11 is produced by two separate motors.

Figure 4:
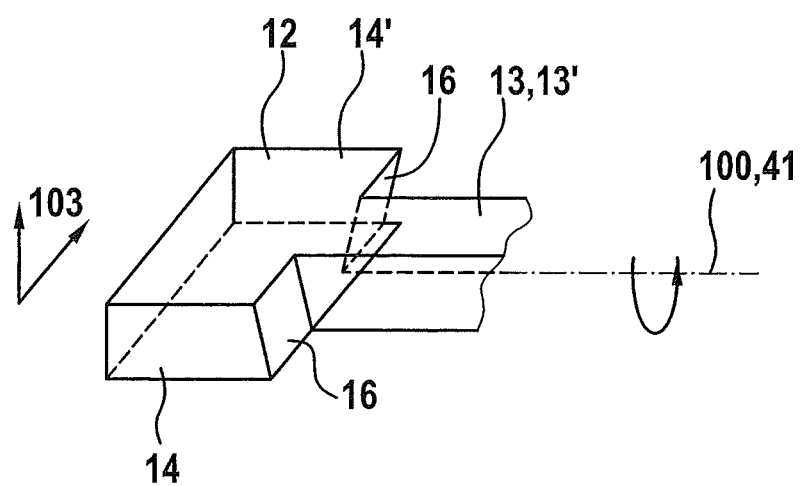
FIG. 4 shows a schematic perspective view of a holding element of a device according to a second specific embodiment of the present invention.

FIG. 4 shows a schematic perspective view of a holding element 11 of a device 10 according to a second specific embodiment of the present invention; the second specific embodiment essentially is similar to the first specific embodiment shown in FIG. 2, keyed-connection elements 14, 14' having functional areas 16 for cooperating with holding means 22, which are facing first subregion 13' (not shown in FIG. 4 for reasons of clarity) and which are inversely beveled or inclined in relation to a transverse plane 103 extending perpendicularly to axial direction 100. When push-twist locking element 12 is transferred from the first angular position to the second angular position, functional areas 16 consequently exert a force on holding means 22 that is acting along axial direction 100 in the direction of base body 40, thereby, for example, achieving sealing contact between inner sheathing element 25 and base body 40. In particular the third substep for the application of force to holding means 11 in the direction of base body 40 thus is not required.

What is claimed is:

1. A device for holding a component to be sheathed with plastic, the device comprising:
 a holding element configured to establish a releasable mechanical keyed connection with an affixation region of the component to be sheathed with plastic, wherein the holding element has a push-twist locking element, wherein:
  the holding element extends along an axial direction;
  the holding element has a mandrel which extends along the axial direction, wherein the mandrel has a cylindrical first subregion and a square-shaped second subregion, a maximum diameter of the second subregion being smaller than a maximum diameter of the first subregion and wherein the push-twist locking element is developed on an end region of the second subregion; and
  the push-twist locking element includes at least one keyed-connection element projecting from the mandrel along a transverse direction which extends perpendicularly to the axial direction of the mandrel.

2. The device as recited in claim 1, wherein the push-twist locking element has two keyed-connection elements, one of the two keyed-connection elements being situated on each side of the mandrel along the transverse direction.

3. The device as recited in claim 1, wherein a first maximum extension of the holding element along the transverse direction in the region of the at least one keyed-connection element is greater than a second maximum extension of the holding element along the transverse direction in an affixation region adjacent to the keyed-connection element along the axial direction.

4. The device as recited in claim 3, wherein the first maximum extension of the holding element along the transverse direction in the region of the at least one keyed-connection element is greater than a third maximum extension of the holding element along a further transverse direction which extends perpendicularly to both the axial direction and the transverse direction.

5. The device as recited in claim 1, wherein:
 on a side facing away from the component, the at least one keyed-connection element has a functional area for at least one of form-fitting and force-fitting cooperation with the affixation region, the functional area being beveled in relation to a transverse plane which extends perpendicularly to the axial direction.

6. The device as recited in claim 1, further comprising:
 a base body;
 wherein the holding element is mounted on the base body and supported on the base body so as to allow at least one of (i) a displacement in the axial direction, and (ii) a rotation about an axis of rotation extending centrally through the holding element and parallel to the axial direction.

\* \* \* \* \*